P. FEDOROW AND J. KORPAN.
AUTOMOBILE FENDER.
APPLICATION FILED APR. 6, 1922.

1,438,029.

Patented Dec. 5, 1922.
2 SHEETS—SHEET 1.

INVENTOR.
Peter Fedorow & Joseph Korpan
BY
George C. Harrison
ATTORNEY

P. FEDOROW AND J. KORPAN.
AUTOMOBILE FENDER.
APPLICATION FILED APR. 6, 1922.
1,438,029.
Patented Dec. 5, 1922.
2 SHEETS—SHEET 2.
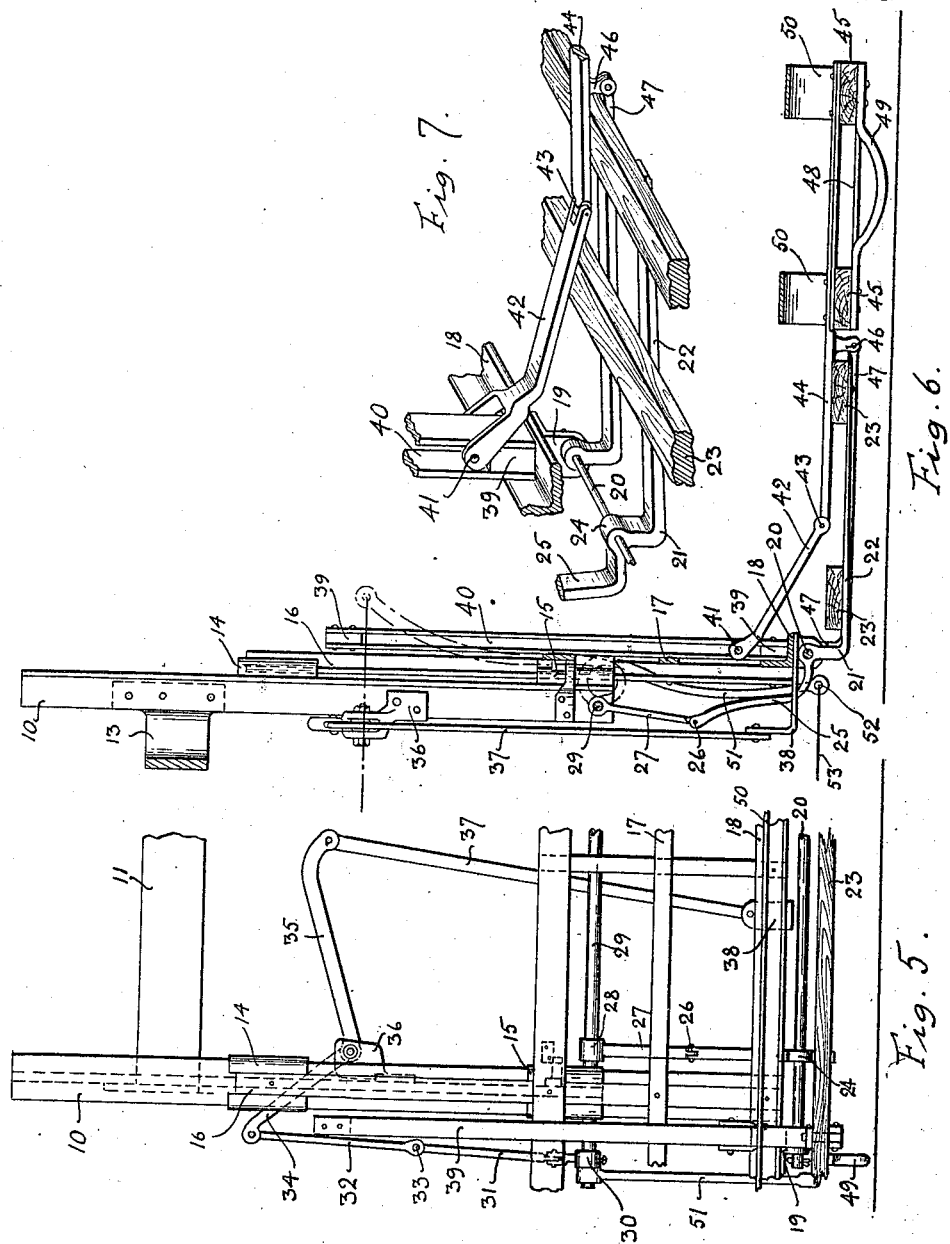
INVENTOR.
Peter Fedorow & Joseph Korpan
BY
Genge C. Heinrich
ATTORNEY Patented Dec. 5, 1922.

1,438,029

UNITED STATES PATENT OFFICE.

PETER FEDOROW AND JOSEPH KORPAN, OF CHICAGO, ILLINOIS.

AUTOMOBILE FENDER.

Application filed April 6, 1922. Serial No. 550,018.

*To all whom it may concern:*

Be it known that I, PETER FEDOROW, a citizen of Poland, residing at Chicago, county of Cook, and State of Illinois, and I, JOSEPH KORPAN, a citizen of Poland, residing at Chicago, county of Cook, and State of Illinois, have invented certain new and useful Improvements in Automobile Fenders, of which the following is a specification.

The present invention relates to improvements in automobile fenders, and it is the principal object of the invention to provide a fender which, when not in use is conveniently folded and held against the front part of a car, and can be instantly operated to save a person in danger of being run over, from injury.

Another object of the invention is to provide a fender of novel design and construction capable of being quickly operated from the emergency brake of a car or by hand to pick up persons in danger of being run over, supporting the same until the car comes to a full stop.

These objects are attained by the novel construction and combination of parts hereinafter described and shown in the accompanying drawings, forming a material part of this disclosure, and in which:

Figure 5 is a fragmentary front view of the device.

Figure 6 is an edge view thereof seen from line 5—5 Figure 3.

Figure 7 is a detail view of the folding links and levers.

Figure 2:
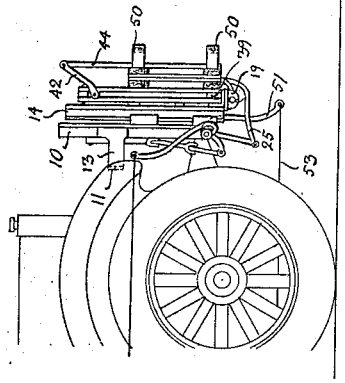
Figure 2 is a side view thereof.
Figure 4:
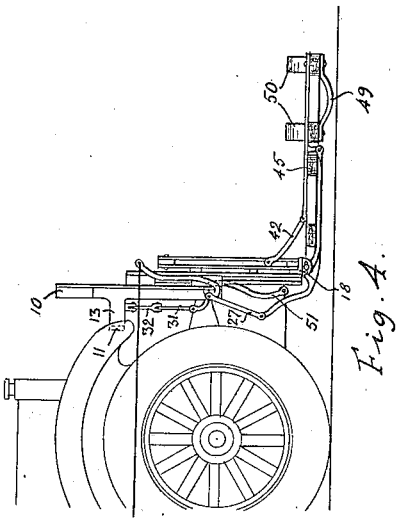
Figure 4 is a side view of the device as shown in Figure 3.
Figure 1:
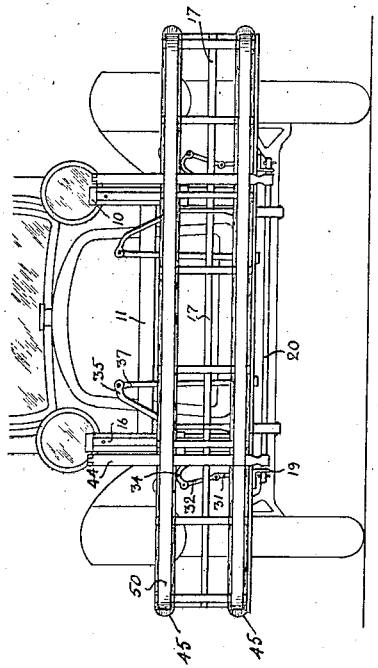
Figure 1 is a front view of part of an automobile equipped with a fender constructed according to the present invention in its position of rest.
Figure 3:
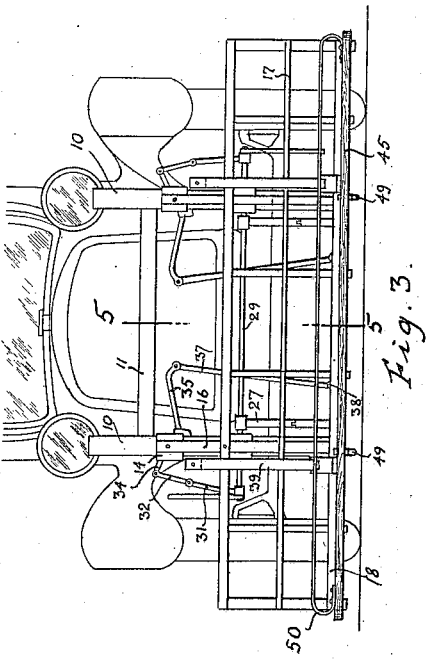
Figure 3 shows the device in operative position in front view.

The device is secured to the front of an automobile in any suitable convenient manner, and comprises a frame composed of a pair of uprights 10 connected by a horizontal bar 11 having rectangularly bent side arms 13. To the front faces of the uprights 10, guides 14 and 15 are attached for sliding bars 16 of T-section, the foot flanges of which slide in the guides. The bars 16 carry attached to their front faces a frame 17 including a horizontal lower bar 18 of L-shaped cross section. To the under face of this bar 18 are secured spaced brackets 19, in which a horizontal bar 20 is supported, on which the knee parts of brackets 21 are rotatably held, the lower arms 22 of which are extended forwardly and secured to the undersides of wooden strips 23. These arms form knees 24, and their upper parts 25 are pivotally connected as indicated at 26 to upper arms 27 secured by means of sleeves 28 to an upper horizontal bar 29 resting in the uprights 10 and extended therethrough.

The outer extremities of this bar 29 carry on the outside of uprights 10 secured thereto a horizontal link 30 to the outer free end of which the lower end of one arm of a bell crank lever 31 is pivotally secured, the other arm 32 of which is pivoted at 33 to arm 31. To the upper end of this bell crank lever, the shorter arm 34 of another bell crank lever is pivotally secured, the longer arm 35 of which is pivoted at its point of connection with the shorter arm to a bracket 36 secured to upright 10. These parts are provided in duplicate sets, one at each end of the fender.

To the outer end of the arm 35 is pivotally connected one end of a link 37, the other end of which is secured to a bracket 38 attached to the underside of bar 18. To the upper face of this bar 18 is secured by its lower end a vertical upright 39 having a forked central part forming a longitudinal slot 40.

In this slot 40 a pin 41 is vertically traveling which connects the forked end of a lever 42 connected by a knuckle joint 43 to a bar 44 secured with its forked end to two fender strips 45 parallel to strips 23.

A bracket 46 is attached to the lower face of bar 44 and to its lower end is pivotally secured a rod or bar 47, the free end of which is secured to bar 20.

To the lower side of the strip 45 connecting rods 48 are secured and attached thereto at the extreme outer ends of strip 45, springs 49 are secured serving as buffers working against the ground. Springs 50 are secured to the upper face of bar 44 above strip 45. Crank arms 51 are secured to the extreme outer ends of bar 29 and their free ends are formed into eyes 52 for the attachment of cables 53 by means of which the fender may be operated from a brake or any other suitable part of an automobile for instance the emergency brake or by hand.

The device operates as follows—

If a person in the path of the car is in danger of colliding with the same, the operator by setting the emergency brake or by hand will release the cables 53 so that frame 18 and the T-bar 16 connected therewith will drop under their own weight so that the rear part of the frame formed by strips 23 will execute a downward motion in which the pin 41 will participate so that lever 42 and 44 the latter of which is fastened to the front part of the fender formed by strips 45, will turn the same around pivot point 46 into the position shown in Figure 6. If it is desired to fold the fender again against the front part of the car, crank 51 is operated to lift frame 18 and therewith uprights 39, and to operate arms 21, and 47 as well as arms 42 and 44 to fold the outer part of the fender with its lower face against the lower face of the inner part which is carried against frame 17, 18. If the cable 53 is now fastened in any convenient manner to a suitable part of the car, the fender will be kept folded and ready for a new operation.

What we claim as new and desire to secure by Letters Patent of the United States is—

1. In a device of the character described a horizontal shaft, a crank for rotating said shaft, a frame, means for raising said frame, a bell crank lever, a bi-partite folding platform, one arm of said bell crank lever carrying the rear part of said platform, and a link connecting the other arm of said bell crank lever to said shaft, the front part of said platform hingedly connected to the rear part to fold both with their undersides to engage each other, and means for releasing said frame raising means, for allowing a dropping of said frame under its own weight to extend the parts of the fender.

2. In a fender of the class described, a pair of movable T-bars, means for normally holding said T-bars in their raised position, a vertical frame carried by said T-bars, guides for said T-bars, a pair of longitudinally slotted uprights resting upon the lower L-shaped bar of said frame, pins reciprocating in the slots of said uprights, a bi-partite fender frame, hinge connections between both frames for allowing a folding of the same against each other with their undersides in engagement, rods connected to the upper face of the outer part of said fender frame, and links connected to said rods, having forked ends in which said pins are transversely held, said rods and pins allowing an unfolding of said fender frame under the weight of the parts upon the release of said T-bar raising means.

3. In a fender of the class described, a pair of vertically movable T bars, posts adapted to be secured to a car and guides on said posts for guiding said T-bars, a vertical frame secured to the front faces of said T-bars, operating rods secured with the lower ends to the lowermost L-bar of said vertical frame, bell crank levers secured to said rods, an operating rod for said bell crank levers, a crank for operating said operating rod, means for holding said T-bar and vertical frame in their raised position, a bi-partite folding fender frame, bell crank levers guided around said L-bar for supporting the rear part of said folding frame, a pair of hinges attaching the front part of said fender frame to the rear part for allowing a folding of these parts against each other with their lower faces in engagement, longitudinally slotted uprights on said L-bar in front of said T-bars, pins traveling in the slots of said uprights, means connecting said pins with the upper face of the front part of said fender frame, said fender frame adapted to unfold upon the lowering of said T-bars under their own weight upon the release of said means holding the T-bars normally in their raised position.

In testimony whereof we have affixed our signatures.

PETER FEDOROW.
JOSEPH KORPAN.